Figure 1:
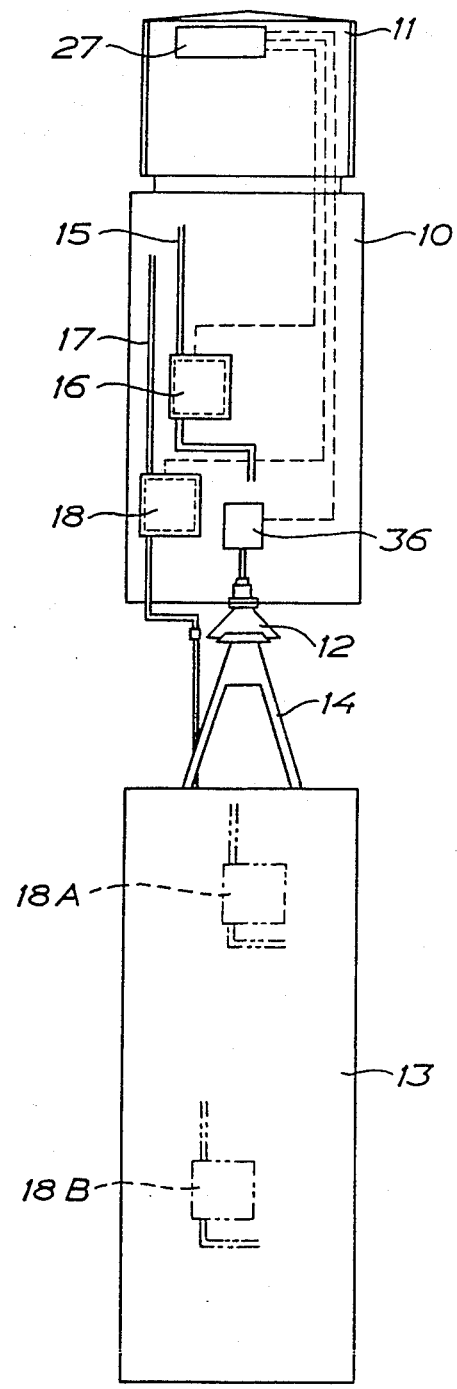

United States Patent [19]

Öhrgard

[11] Patent Number: 4,763,958
[45] Date of Patent: Aug. 16, 1988

[54] APPARATUS FOR MATCHING THE BRAKE PRESSURE OF VEHICLE COMBINATIONS TO THE ACTUAL LOAD

[75] Inventor: Stephan N. A. Öhrgard, Sibbhult, Sweden

[73] Assignee: VBG Produkter AB, Vanersborg, Sweden

[21] Appl. No.: 889,940

[22] PCT Filed: Oct. 17, 1985

[86] PCT No.: PCT/SE85/00401

§ 371 Date: Aug. 14, 1986

§ 102(e) Date: Aug. 14, 1986

[87] PCT Pub. No.: WO86/02323

PCT Pub. Date: Apr. 24, 1986

[30] Foreign Application Priority Data

Oct. 17, 1984 [SE] Sweden .................. 8405181
May 9, 1985 [SE] Sweden .................. 8502325

[51] Int. Cl.⁴ ............................................. B60T 7/20
[52] U.S. Cl. ................................ 303/8; 188/3 R; 188/112 R; 323/7; 323/20
[58] Field of Search ............ 303/7, 8, 20, 22 R, 303/91, 69; 188/3 R, 112

[56] References Cited

U.S. PATENT DOCUMENTS

| | | | |
|---|---|---|---|
| 2,856,036 | 10/1958 | Mullen | 188/112 |
| 3,054,476 | 9/1962 | Corrigan, Jr. | 188/3 R |
| 3,101,957 | 8/1963 | Adams | 303/8 |
| 3,840,276 | 10/1974 | Jubenville | 303/7 X |
| 3,897,979 | 8/1975 | Vangalis et al. | 303/20 X |
| 3,955,652 | 5/1976 | Nilsson et al. | 188/112 |
| 4,099,790 | 7/1978 | Hipps | 303/7 |
| 4,313,616 | 2/1982 | Howard | 188/3 R |

FOREIGN PATENT DOCUMENTS

| | | |
|---|---|---|
| 2702573 | 7/1977 | Fed. Rep. of Germany . |
| 365467 | 7/1970 | Sweden . |
| 1173543 | 12/1969 | United Kingdom . |
| 1587405 | 4/1981 | United Kingdom . |
| 2133099 | 7/1984 | United Kingdom . |

*Primary Examiner*—Duane A. Reger
*Assistant Examiner*—Matthew C. Graham
*Attorney, Agent, or Firm*—Merchant, Gould, Smith, Edell, Welter & Schmidt

[57] ABSTRACT

Apparatus for matching the brake pressure of vehicle combinations to the actual load comprising tranducers (36, 41) for adjusting the brake pressure of the units (10, 13) included in the vehicle combination, in dependence on pulling and pushing, respectively, of a coupling between the tractor vehicle and the trailer vehicle and in dependence on the loading of the vehicles.

2 Claims, 4 Drawing Sheets

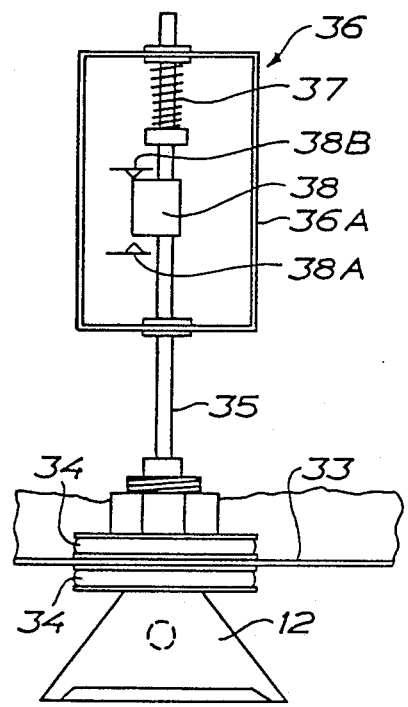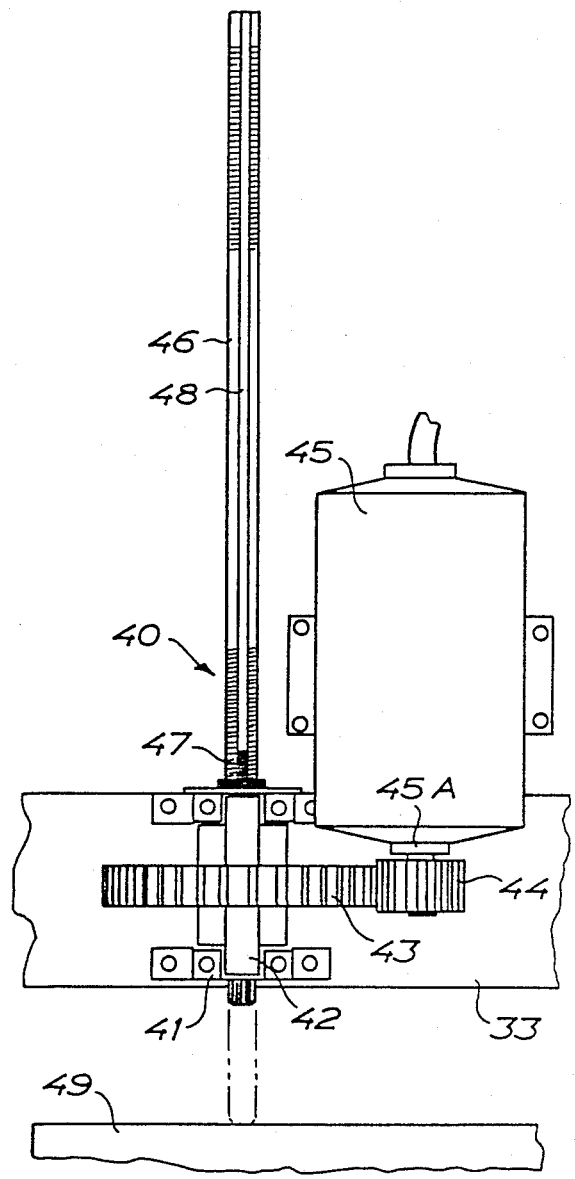
FIG. 3
FIG. 4

APPARATUS FOR MATCHING THE BRAKE PRESSURE OF VEHICLE COMBINATIONS TO THE ACTUAL LOAD

The invention relates to an apparatus in a vehicle combination with air pressure brakes and with a coupling between a tractor vehicle and a trailer vehicle, for matching the brake pressure to the actual load.

The vehicle combinations that may be referred to, are the combination of a tractor vehicle with a trailer vehicle connected therewith, and semi-trailers, wherein the primary brake pressure has to be reduced to a secondary pressure matching the load, in order to obtain at braking of the vehicle combination a brake pressure which is distributed to the units of the vehicle combination according to the actual load. This matching should be made in order to avoid wheel locking at braking, overheating of the brakes, unnecessary tyre wear, and unnecessary wear of the coupling between the tractor vehicle and the trailer vehicle, etc.

For this purpose there has previously been used in vehicle combinations comprising a tractor vehicle and a trailer vehicle, so-called load-sensing valves which are positioned between the chassis frame and the wheel shaft so as to be actuated in dependence on the chassis frame supported by springs on the wheel shafts being depressed more or less by the actual load. These load sensing valves have been found to function unsatisfactorily on the tractor vehicle as well as the trailer vehicle, because they are positioned in aggressive environment, which requires exceptionally extensive maintenance, and because they tend to stick by freezing in a cold climate. Moreover, they can hardly be used on trailer vehicles, because the trailer vehicle usually has a harder spring suspension necessary in order to make the vehicle stable, and the spring movement between unloaded trailer vehicle and fully loaded trailer vehicle as a consequence thereof is so small (only a cm or two) that it can hardly be utilized when the control has to be accurate. The load sensing valves shall automatically provide the necessary matching of the brake pressure, but this automatic function is unreliable, because it can in no way be controlled.

The purpose of the invention is to provide an apparatus of the kind referred to above which makes possible a reliable and accurate matching of the brake pressure and distribution of the brake pressure on the units of the vehicle combination irrespective of the actual load or load distribution of the vehicle combination.

This is achieved by the apparatus of the invention having obtained the characteristics according to claim 1.

The apparatus of the invention provides a reliability which is superior to that obtained with load sensing valves, which means an increased safety in traffic.

Figure 2:
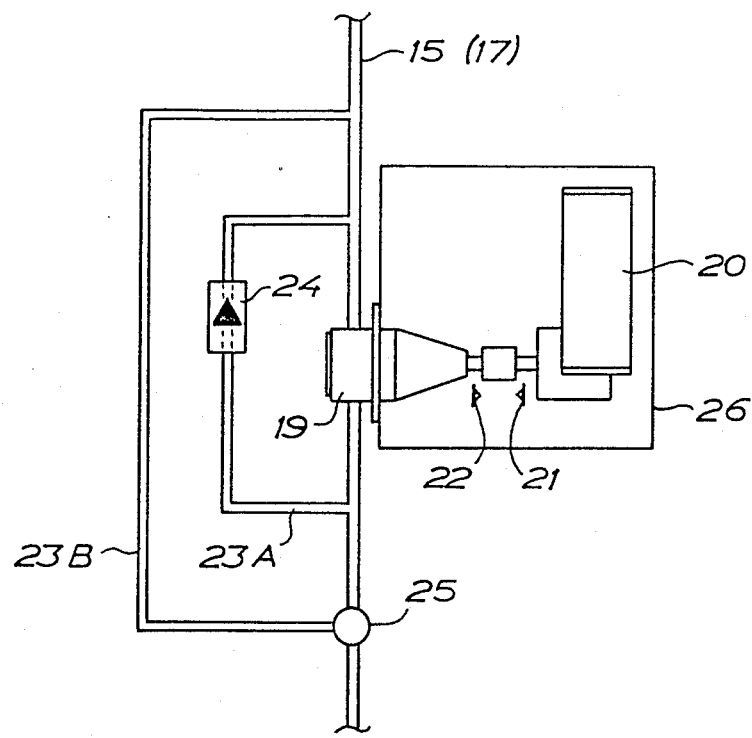
Figure 6:
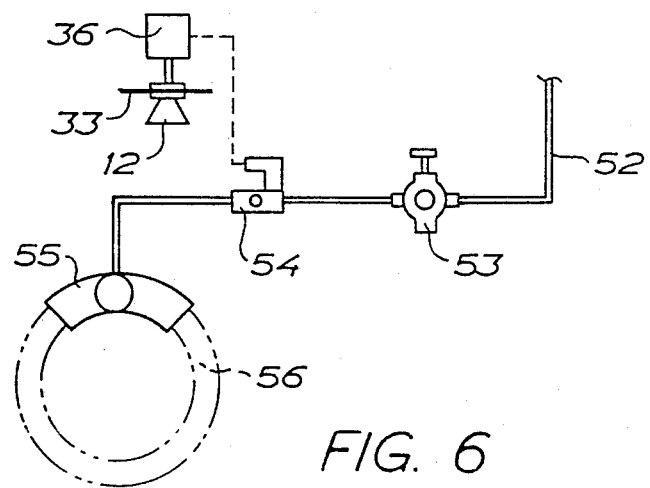
Figure 5:
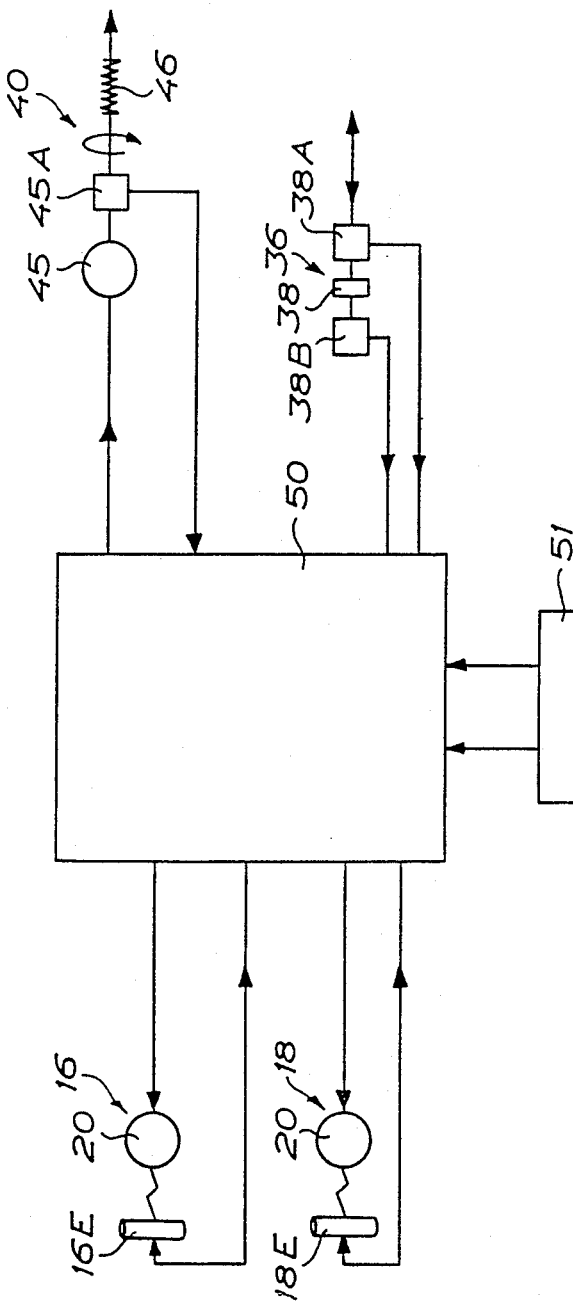

In order to explain the invention in more detail embodiments thereof will be described below with reference to the accompanying drawings in which FIG. 1 is a diagrammatic plan view of a vehicle combination comprising a tractor vehicle and a trailer vehicle, wherein the apparatus of the invention is provided, FIG. 2 is a diagrammatic view of a regulator unit in the apparatus of the invention, FIG. 3 is a horizontal sectional view of a transducer included in the coupling device of the tractor vehicle, FIG. 4 is a side view of a transducer in the apparatus of the invention for measuring the actual loading of the vehicle, FIG. 5 is a block diagram of an electronic unit in the apparatus of the invention, and FIG. 6 is a diagram of a turn bearing brake which may be included as a complement in the apparatus of the invention.

In FIG. 1 there is shown a tractor vehicle 10 with a driver's cabin 11 and with a coupling device 12 at the rear end, to which a trailer vehicle 13 is connected by means of a tow bar 14. On the vehicle there is provided an air conduit 15 for primary brake pressure to a regulator unit 16 for the brakes of the tractor vehicle and an air conduit 17 to a regulator unit 18 for the brakes of the trailer vehicle. The primary pressure in the conduits 15 and 17 has to be reduced to a pressure, the secondary pressure, which is matched to the actual load on the tractor vehicle and the trailer vehicle, respectively, by means of the two regulator units 16 and 18. The regulator unit 18 can instead be located on the trailer vehicle and it can also be replaced by two regulator units on the trailer vehicle, one unit for the brakes of the front shaft and one unit for the brakes of the rear shaft, as indicated in FIG. 1 by two regulators 18A and 18B being shown by dot and dash lines on the trailer vehicle.

The construction of the regulator unit will be seen from FIG. 2. A pressure-reading valve 19 is connected in the conduit 15 (and conduit 17, respectively) and is operatively connected with an electric motor 20 for the adjustment of the pressure-reducing valve. Limit switches 21 and 22 are provided to be actuated when the maximum and minimum secondary pressure, respectively, has been set by means of the pressure-reducing valve. In a shunt conduit 23A of the pressure-reducing valve there is provided a check valve 24 for rapid venting, and a further shunt conduit 23B is provided and can be connected by means of a three-way valve 25 in order that the pressure-reducing valve can be disconnected from the brake system if said valve or other part of the apparatus for the brake pressure matching should fail. The vital parts of the regulator unit are enclosed in a box of stainless steel.

According to FIG. 3, the coupling device 12 provided on the tractor vehicle 10 is connected to the chassis of the tractor vehicle in a known manner, the chassis being fragmentarily shown at 33, with interposed rubber blocks 34 such that the coupling device can be displaced axially to a limited extent under pulling or pushing. A bar 35 is connected with the coupling device and is displaceably mounted in a transducer 36 having a housing 36A of stainless steel. The bar can be displaced against the bias of a compression spring 37 into the housing as seen from the coupling device and supports a contact element 38 which is arranged for co-operation with two stationary contacts 38A and 38B. The contact element 38 will connect to the contact 38A when pulling is imposed to the coupling device, and will connect to the contact 38B when pushing is imposed to the coupling device. The contact arrangement described thus will indicate if the trailer vehicle 13 at braking of the vehicle combination is more heavily braked than the tractor vehicle 10 (pulling of the coupling device) or is braked less heavily than the tractor vehicle (pushing of the coupling device).

In the apparatus of the invention there is also included a transducer 40 e.g. according to FIG. 4 for measuring and indicating the actual loading. One transducer must be provided on the tractor vehicle and one on the trailer vehicle. On the body (platform body) or chassis of the related vehicle, the body being fragmentarily shown in FIG. 4 at 33, a bearing unit 41 is mounted wherein a nut 42 is rotatably mounted, said nut being provided with a gear wheel 43. A cog wheel 44 on the output shaft of an electric motor 45 engages the gear wheel. A gauge rod 46 which has a screw thread engages the nut 42 and can be displaced axially by the nut being rotated, the gauge rod being prevented from rotating by a stationary wedge 47 which engages a linear axial groove 48 in the gauge rod.

When the vehicle is loaded, the gauge rod 46 is displaced to engage the wheel shaft of the vehicle, which is shown fragmentarily at 49 in FIG. 4, and the extent of the displacement will be dependent on the extent to which the vehicle has been loaded. The motor can be controlled in such a way that the rotational direction thereof will be reversed immediately after the gauge rod has engaged the shaft, so as to return the gauge rod to the upper displaced position. The extent of the displacement can be measured by means of a pulse transmitter 45A on the motor 45.

FIG. 5 discloses the electronic unit which shall form part of the apparatus of the invention to control all the functions thereof. In the electronic unit there is included a central unit 50 which is connected by proper interfaces to the regulator units 16 and 18, to the transducer 36 and to the transducers 40 (only one thereof is shown) and to the parking brake of the vehicle, which is indicated at 51. In FIG. 5, the regulator units are shown to be supplemented with a follow-up potentiometer 16E and 18E, respectively, the adjustment of which takes place in dependence on the adjustment of the reducing valve in order that the potentiometer shall provide a signal indicating the secondary pressure set by means of the regulator unit.

The central unit is programmed to provide the following function of the apparatus of the invention.

When the parking brake 51 is disengaged, the central unit 50 starts the regulator unit 18 of the trailer vehicle 13 and adjusts this unit to the maximum secondary pressure (maximum brake effect) on the trailer vehicle. At the same time the motor 45 in the transducer 40 will be energized, the gauge rod 46 being displaced downwards to engage the wheel shaft 49. When the gauge rod is moving, pulses are supplied from the pulse transmitter 45A, and when the pulses cease after the gauge rod having been engaged with the shaft, the number of pulses received indicates the loading of the trailer vehicle. The central unit then reverses the rotating direction of the motor 45, the gauge rod being again displaced upwards to the initial position. Then, the central unit calculates the actual load and the nominal value for this load in the regulator unit 18 so that the desired secondary pressure (brake pressure) is obtained on the trailer vehicle. At the calculation, constants are used which can easily be changed in the central unit. The actual adjustment of the regulator unit 18 is indicated by the potentiometer 18E and can be shown in the drivers's cabin on a pointer instrument, by means of LED, or in another way.

The central unit 50 then repeats the same adjustment with regard to the regulator unit 16 on the tractor vehicle 10. At the first brakings after start, the central unit registers the signal from the transducer 36 to adjust in dependence thereon the distribution of the brake force to the tractor vehicle and the trailer vehicle, which preferably is made by reducing the brake effect on the trailer vehicle when pulling is indicated, and increasing the brake effect on the trailer vehicle when pushing is indicated. Then, the central unit locks the adjustments made with the brake force correctly matched and distributed according to the actual load on the tractor vehicle and the trailer vehicle, respectively.

The valve 25, FIG. 2, can comprise a valve (solenoid valve) which can be actuated by means of the trailer brake on the tractor vehicle so that when the trailer brake arranged as an emergency brake is engaged if the driver gets the impression of unsufficient brake effect, the valve 25 will be adjusted to shunt the regulator unit 18 through the conduit 23B and to supply to the brake of the trailer vehicle full brake pressure equalling the primary pressure.

The invention principally can be applied in the same manner as described above on a semi-trailer.

The turn bearing brake shown in FIG. 6 provides an excellent and valuable complement to the apparatus of the invention so as to prevent so-called pocket-knife effect when the trailer vehicle is pushing. In a conduit 52 with primary pressure there is provided a pressure regulator 53 and a solenoid valve 54, and the conduit is connected via these valves to a brake caliper 55 which acts on a brake disk 56 on the turn bearing of the trailer vehicle 13. The brake is engaged by opening the solenoid valve 54 in dependence on a signal from the transducer 36 at pushing (the contact element 38 connects to the stationary contact 38B). The turn bearing brake can be activated and de-activated by means of a suitable switch in the driver's cabin.

I claim:
1. Vehicle combination comprising a tractor vehicle, a trailer vehicle, a coupling connecting said tractor vehicle to said trailer vehicle, air pressure brakes on said vehicles, air conduits for supplying pressurized air to said brakes, a transducer operatively connected to said coupling to provide a signal indicating pulling and pushing, respectively, of the coupling, a servo-regulator unit operatively connected to said air conduits for adjusting the pressure of pressurized air supplied to said brakes through said air conduits, and a central unit operatively connected to said servo-regulator unit and to said transducer for controlling said pressure in dependence on said signal provided by said transducer when the air pressure brakes of the vehicles are being actuated.

2. Vehicle combination as in claim 1 further comprising means in the tractor vehicle, operatively connected to the servo-regulator unit for shunting said unit when the trailer brake is actuated.

* * * * *